2,999,870
PROCESS OF PREPARING 4-HYDROXY-3-KETO-4-ANDROSTENES
Bruno Camerino, Renato Modelli, and Bianca Patelli, all of Milan, Italy, assignors to Società Farmaceutici Italia, a corporation of Italy
No Drawing. Filed Feb. 28, 1961, Ser. No. 92,175
Claims priority, application Italy Mar. 1, 1960
10 Claims. (Cl. 260—397.4)

The invention relates to a process of preparing 4-hydroxy-3-keto-4-androstenes from the corresponding 4,5-epoxy-3-keto-androstanes. It especially relates to the manufacture of 4-hydroxy-3-keto-4-androstenes having the general formula:

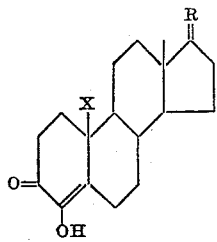

wherein
X=H or $CH_3$
R=$\alpha H$, $\beta OH$ or $\alpha CH_3$, $\beta OH$.

The products of the general formula are known. They are especially useful in therapy, owing to their hormonal properties. Some of these substances are also useful as intermdiates in the manufacture of the corresponding esters, which have the same hormonal activity, but have a prolonged effect. 4-hydroxy-testosterones, the corresponding esters and their hormonal properties have been described by H. Levy et al. (U.S.P. 2,762,818).

The chemical and therapeutic characteristics of the 4-hydroxy-19-nortestosterone and its esters are described in Belgian Patent 552,153.

As far as is known, there are substantially three processes for the manufacture of 4-hydroxy-3-keto-4-androstenes (IV) from the corresponding 3-keto-4-androstenes (I). They are illustrated in the reaction scheme below, and are described as follows:

(1) By dehydration with acids (such as p.toluene-sulfonic acid or hydrochloric acid) of the 4,5-dihydroxy-3-keto-androstanes (III), which are obtained from the corresponding 3-keto-4-androstenes (I), by dihydroxylation in 4,5-positions with osmium tetraoxide and hydrogen peroxide (H. Levy et al.: U.S.P. 2,762,818).

(2) By isomerization with acids, such as sulfuric acid in acetic acid or boron trifluoride, of the 4,5-epoxy-3-keto-androstanes (II), which are obtained with alkaline hydrogen peroxide (B. Camerino et al.: J.A.C.S. 78, 1956, p. 3540 and U.S.P. 2,842,571).

(3) By a synthesis which comprises the dibromination in 2,6-positions of the 3-keto-4-androstenes (I) to yield the 2,6-dibromo-3-keto-androstenes (V), from which the 4-keto-3-acyloxy-2,5-androstadienes (VI) are obtained by dehydrobromination, which by hydrogenation of the double bonds $\Delta^2$ and $\Delta^5$ (VIII), followed by hydrolysis of the acyloxy group in 3-position (VIII), and final oxidation with $Bi_2O_3$, are transformed into 4-hydroxy-3-keto-4-androstenes (IV) (P. L. Julian et al.: U.S.P. 2,900,399).

The said reaction scheme is as follows:

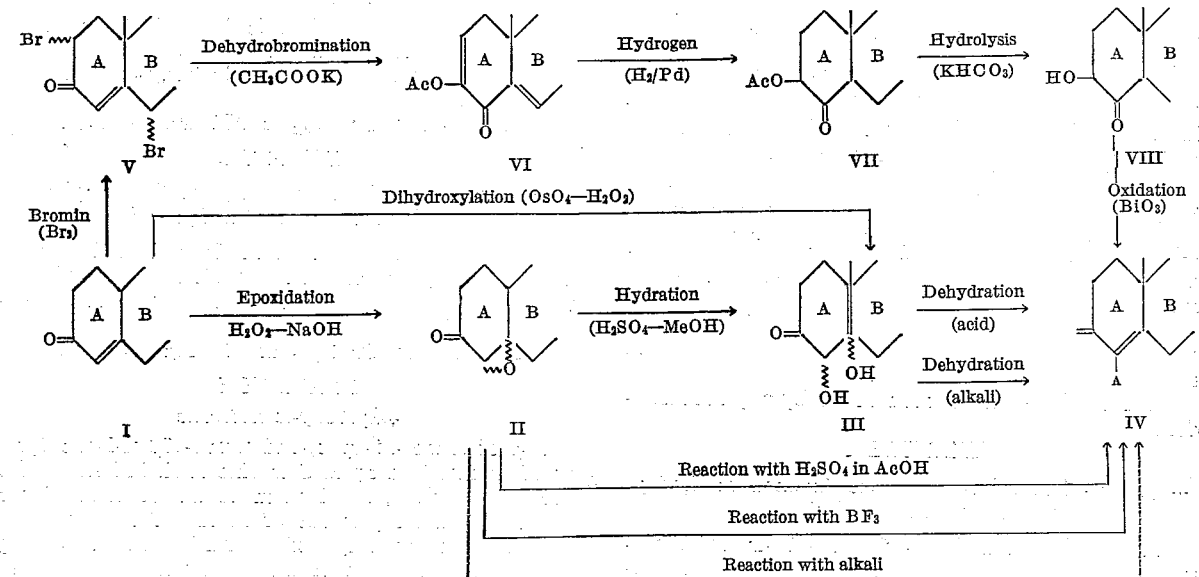

It is known that a number of the aforesaid steps, such as the bromination with bromine, the catalytic hydrogenation, the dehydrobromination and the use of $OsO_4$ and $BF_3$ are undesirable from an industrial point of view, because they are expensive and/or dangerous, and/or because they give poor yields.

Besides, B. Camerino et al. have recently disclosed that the preparation of 4-hydroxy derivatives of 17α-methyl-testosterone and 17α-methyl-19-nortestosterone by isomerization of the corresponding 4,5-epoxy-3-keto-steroids with acids is impossible because such conditions cause the simultaneous removal of the hydroxy group in 17-position.

Overcoming these difficulties, B. Camerino et al. succeeded in preparing said derivatives of 4-hydroxy-17α- methyl-androstane by hydration, with diluted sulfuric acid in methanol, of the 4,5-epoxy-3-keto-androstanes (II) to yield the 4,5-dihydroxy-derivatives (III), from which by the 4-hydroxy-3-keto-derivatives (IV) have been obtained by dehydration with alkali.

The process of the instant invention permits the direct manufacture of 4-hydroxy-3-keto-androstenes (IV), including the 17α-methyl analogues, from the corresponding 4,5-epoxy-steroids by reaction with suitable inorganic and/or organic bases, particularly under special experimental conditions.

The transformation of the 4,5-epoxy-3-keto-androstanes (II) to 4-hydroxy-3-keto-4-androstenes (IV) by the invention is a new and very useful process, because it results in the manufacture of said therapeutically useful products with good yields (50–80%) by a simple and cheap step.

According to the invention, a 4-hydroxy-3-keto-4-androstene is prepared by treating the corresponding 4,5-epoxy-3-keto-androstane, dissolved in an organic solvent, preferably a tertiary aliphatic alcohol such as t.butanol or t.pentanol, with an aqueous solution of an alkali metal hydroxide and/or a quaternary ammonium hydroxide at from 50° C. to 150° C., preferably from 70° C. to 100° C. for from 0.5 to 5 hours, preferably from 1 to 2 hours, the employed molecular ratio of hydroxide to steroid being from 0.5 to 30, preferably from 5 to 15.

Sodium hydroxide and potassium hydroxide may be used as the alkali metal hydroxides. Tetramethylammonium hydroxide, tetraethylammonium hydroxide, phenyltrimethylammonium hydroxide, methylethylpiperidinium hydroxide, benzyltrimethylammonium hydroxide, diethylbenzyl-n.octylammonium hydroxide, methylethylbenzyldodecylammonium hydroxide; and, equally well, the other quaternary ammonium compounds reported in Kirk-Othmer: Encyclopedia of Chemical Technology, vol. XI, pages 382–386, may be used as quaternary ammonium compounds.

At the end of the reaction, the mixture is neutralized with acid such as acetic acid, and the process of isolating the product is carried out according to the known procedures, and the product may be purified either by recrystallization or by chromatography and subsequent elution and recrystallization from organic solvents.

Not only the products of the aforesaid general formula: 4-hydroxy-testosterone, 4-hydroxy-19-nortestosterone, 4-hydroxy-17-methyl-testosterone and 4-hydroxy-17α-methyl-19-nortestosterone, have been prepared, but also other 4-hydroxy-3-keto-4-androstenes having ketonic groups and/or hydroxy groups and/or alkyl groups in other positions of the steroid nucleus.

The following examples are set forth by way of illustration:

EXAMPLE 1

*4-hydroxy-17α-methyl-testosterone (method employing potassium hydroxide)*

The starting material, 4,5-epoxy-17α-methyl-androstane-17β-ol-3-one, is prepared by epoxidation with alkaline hydrogen peroxide of the 17α-methyl-testosterone according to the general procedure described by B. Camerino et al. in J.A.C.S. 78, 1956, page 3541. Specifically, 10 g. of 17α-methyl-testosterone dissolved in 500 ml. of methanol are epoxidized in the 4,5-position with 20 ml. of aqueous 4 N sodium hydroxide and 34 ml. of aqueous 34% hydrogen peroxide for 3 hours at 0° C.

0.5 g. of crude 4,5-epoxy-17α-methyl-androstane-17β-ol-3-one dissolved in 20 ml. of t.butanol are isomerized in the presence of 0.5 g. of potassium hydroxide dissolved in 0.5 ml. of water, at the boiling point for two hours. The solution is then cooled, neutralized with 0.5 ml. of acetic acid, and poured into salt-water. The steroid is extracted with ethyl acetate.

The extract is washed with aqueous 10% sodium bicarbonate and finally with water to neutrality. After evaporation of the solvent a residue of 0.5 g. remains.

By recrystallization from methanol or by chromatography on Florisil (registered trademark), followed by crystallization of the fractions diluted with benzol-ether (14:1), 4-hydroxy-17α-methyl-testosterone is obtained.

M.P.=168–170° C.; $\lambda_{max}$ at 277 m$\mu$ ($\epsilon$=12,800).

EXAMPLE 2

*4-hydroxy-17α-methyl-testosterone (method employing tetraethylammonium hydroxide)*

0.5 g. of crude 4,5-epoxy-17α-methyl-androstane-17β-ol-3-one, dissolved in 20 ml. of t.butanol are isomerized in the presence of 8 ml. of an aqueous 25% tetraethylammonium hydroxide for 2 hours at the boiling point. The process is further continued or carried out as described in Example 1, to yield 4-hydroxy-17α-methyl-testosterone.

M.P.=169–170° C.; $\lambda_{max}$ at 278 m$\mu$ ($\epsilon$=12,950).

EXAMPLE 3

*4-hydroxy-17α-methyl-testosterone (method employing phenyltrimethylammonium hydroxide)*

0.5 g. of crude 4,5-epoxy-17α-methyl-androstane-17β-ol-3-one, dissolved in 20 ml. of t.butanol are isomerized in the presence of 3.5 g. of phenyltrimethylammonium hydroxide dissolved in 15 ml. of water for 1 hour at the boiling point. The remainder of the process is carried out as described in Example 1, to yield 4-hydroxy-17α-methyl-testosterone.

M.P.=168–170° C.; $\lambda_{max}$ at 277 m$\mu$ ($\epsilon$=12,680).

EXAMPLE 4

*4-hydroxy-17α-methyl-testosterone (method employing methylethylpiperidinium hydroxide)*

By operating as described in Example 3, but using methylethylpiperidinium hydroxide instead of phenyltrimethylammonium hydroxide, 4-hydroxy-17α-methyl testosterone is obtained.

M.P. 168–170° C.; $\lambda_{max}$ at 278 m$\mu$ ($\epsilon$=12,850).

EXAMPLE 5

*4-hydroxy-17α-methyl-testosterone (method employing benzyltrimethylammonium hydroxide)*

By operating as described in Example 3 but using benzyl-trimethylammonium hydroxide instead of phenyltrimethylammonium hydroxide, 4-hydroxy-17α-methyl-testosterone is obtained.

M.P. 168–170° C.; $\lambda_{max}$ at 278 m$\mu$ ($\epsilon$=12,990).

EXAMPLE 6

*4-hydroxy-testosterone*

1 g. of crude 4,5-epoxy-androstane-17β-ol-3-one (prepared as described by B. Camerino et al. in J.A.C.S. 78, 1956, page 3540), dissolved in 40 ml. of t.butanol are isomerized in the presence of 16 ml. of aqueous 25% tetraethylammonium hydroxide for 2 hours at the boiling point. The remainder of the process is carried out as described in Example 1, and 4-hydroxy-testosterone is obtained.

M.P. 221–223° C.; $\lambda_{max}$ at 278 m$\mu$ ($\epsilon$=11,920).

EXAMPLE 7

*4-hydroxy-19-nortestosterone*

By operating as described in Example 6, but using crude 4,5-epoxy-19-nor-androstane-17β-ol-3-one instead of crude 4,5-epoxy-androstane-17β-ol-3-one, 4-hydroxy-19-nortestosterone is obtained.

M.P. 188–190° C.; $\lambda_{max}$ at 278 m$\mu$ ($\epsilon$=11,680).

The said crude 4,5-epoxy-19-nor-androstane-17β-ol-3-one is prepared as described in Example 1 of Camerino application Serial No. 618,442, filed October 26, 1956. Namely, 1.9 grams of 19-nortestosterone are dissolved in 120 cc. methanol and treated for one hour with 3.8 cc. 4/N NaOH and 7 cc. 36% $H_2O_2$. The solution is then acidified with 0.4 cc. acetic acid, diluted with water and extracted with ethylacetate. The extract is washed with water, dried, and distilled.

EXAMPLE 8

4-hydroxy-17α-methyl-19-nortestosterone

Upon operating as described in Example 6, but using crude 4,5-epoxy-17α-methyl-19-nor-androstane-17β-ol-3-one (prepared by epoxidation of 10 g. of 17α-methyl-19-nortestosterone dissolved in 600 ml. of methanol in the presence of 20 ml. of aqueous 4 N sodium hydroxide and 34 ml. of aqueous 34% hydrogen peroxide for 1 hour at 0° C.) instead of crude 4,5-epoxy-androstane-17β-ol-3-one, 4-hydroxy-17α-methyl-19-nortestosterone is obtained.

M.P.=168–170° C.; $\lambda_{max}$ at 277 mμ ($\epsilon$=12,850).

EXAMPLE 9

4,11β-dihydroxy-17α-methyl-testosterone

Upon operating as described in Example 6, but using crude 4,5-epoxy-17α-methyl-androstane-11β,17β-diol-3-one (prepared by epoxidation of 10 g. of 11β-hydroxy-17α-methyl-testosterone dissolved in 600 ml. of methanol in the presence of 20 ml. of aqueous 4 N sodium hydroxide and 34 ml. of aqueous 34% hydrogen peroxide for 3 hours at 0° C.) instead of crude 4,5-epoxy-androstane-17β-ol-3-one, 4,11β-dihydroxy-17α-methyl-testosterone is obtained.

M.P.=183–185° C.; $\lambda_{max}$ at 278 mμ ($\epsilon$=12,250).

We claim:

1. A process of preparing a 4-hydroxy-3-keto-4-androstene which comprises treating the corresponding 4,5-epoxy-3-keto-androstane, dissolved in an organic solvent, with an aqueous solution of a base taken from the group consisting of alkali metal hydroxides and quaternary ammonium hydroxides, at from 50° C. to 150° C.

2. The process of claim 1, the solvent being tertiary butanol.

3. The process of claim 1, the solvent being tertiary pentanol.

4. The process of claim 1, the androstene prepared being a compound of the group consisting of 4-hydroxy-17alpha-methyl-testosterone; 4-hydroxy-testosterone; 4-hydroxy-19-nortestosterone; 4-hydroxy-17alpha-methyl-19-nortestosterone; and 4,11beta-dihydroxy-17alpha-methyl-testosterone.

5. A process of preparing a 4-hydroxy-3-keto-4-androstene which comprises treating the corresponding 4,5-epoxy-3-keto-androstane, dissolved in a liquid solvent of the latter, comprising a tertiary aliphatic alcohol, with an aqueous solution of a base taken from the group consisting of alkali metal hydroxides and quaternary ammonium hydroxides, at from 70° C. to 100° C., the molecular ratio of hydroxide to steroid being from 5 to 15 of the hydroxide to 1 of the steroid.

6. A process of preparing 4-hydroxy-17alpha-methyl-testosterone comprising treating 4,5-epoxy-17alpha-methyl-androstane-17beta-ol-3-one dissolved in an organic solvent with an aqueous solution of a base taken from the group consisting of alkali metal hydroxides and quaternary ammonium hydroxides at from 50° to 150° C.

7. A process of preparing 4-hydroxy-testosterone comprising treating 4,5-epoxy-androstane-17beta-ol-3-one, dissolved in an organic solvent, with an aqueous solution of a base taken from the group consisting of alkali metal hydroxides and quaternary ammonium hydroxides at from 50° to 150° C.

8. A process of preparing 4-hydroxy-19-nortestosterone, comprising treating 4,5-epoxy-19-nor-androstane-17beta-ol-3-one, dissolved in an organic solvent, with an aqueous solution of a base taken from the group consisting of alkali metal hydroxides and quaternary ammonium hydroxides at from 50° to 150° C.

9. A process of preparing 4-hydroxy-17alpha-methyl-19-nortestosterone, comprising treating 4,5-epoxy-17alpha-methyl-17-nor-androstane-17beta-ol-3-one, dissolved in an organic solvent, with an aqueous solution of a base taken from the group consisting of alkali metal hydroxides and quaternary ammonium hydroxides at from 50° to 150° C.

10. A process of preparing 4,11beta-dihydroxy-17alpha-methyl-testosterone, comprising treating 4,5-epoxy-17alpha-methyl-androstane-11beta,17beta-diol-3-one dissolved in an organic solvent, with an aqueous solution of a base taken from the group consisting of alkali metal hydroxides and quaternary ammonium hydroxides at from 50° to 150° C.

No references cited.